Aug. 26, 1952 — O. P. KUBACH — 2,608,065
BREAKWATER

Filed Sept. 6, 1947 — 2 SHEETS—SHEET 1

INVENTOR.
OSCAR P. KUBACH
BY William Isler
ATTORNEY.

Aug. 26, 1952     O. P. KUBACH     2,608,065
BREAKWATER

Filed Sept. 6, 1947     2 SHEETS—SHEET 2

INVENTOR.
OSCAR P. KUBACH
BY William Isler
ATTORNEY.

Patented Aug. 26, 1952

2,608,065

UNITED STATES PATENT OFFICE 2,608,065

BREAKWATER

Oscar P. Kubach, Avon Lake, Ohio, assignor to Robert B. Kubach, Detroit, Mich., Richard A. Kubach and William C. Kubach, both of Avon Lake, and Mrs. John Goodson, Yellow Springs, Ohio Application September 6, 1947, Serial No. 772,477

3 Claims. (Cl. 61—4)

1

This invention relates, as indicated, to breakwaters.

Breakwaters have heretofore been proposed for the purpose of breaking the force of water adjacent exposed shore lines of lakes, oceans and other bodies of water, and to prevent or minimize the erosion of such shore lines. In most cases, however, the breakwaters are of extremely complicated and expensive construction, difficult to install or assemble, and maintain, and usually ineffective or only moderately effective for their intended purposes.

A primary object of the present invention is to provide a breakwater or sea wall consisting of units which are of relatively simple and inexpensive construction, which can be easily and quickly assembled and interlocked with each other with a minimum of handling equipment and fastening or securing devices, and which is extremely effective and efficient for its intended purposes.

Another object of the invention is to provide a breakwater of the character described, which is effective to permit water to circulate therethrough in opposite directions, thereby preventing the formation of undesirable stagnant bodies of water or lagoons behind or within the breakwater.

A further object of the invention is to provide a breakwater of the character described, which is effective to permit ice which has accumulated therein to free itself from the breakwater in an extremely simple and efficient manner, whereby the blocking up of passages through the breakwater for long periods is avoided.

Other objects and advantages of the invention will be apparent during the course of the following description.

In the accompanying drawings, forming a part of this specification, and in which like numerals are employed to designate like parts throughout the same, Fig. 1 is a fragmentary top plan view of a breakwater embodying the principal features of the invention;

Figure 1:
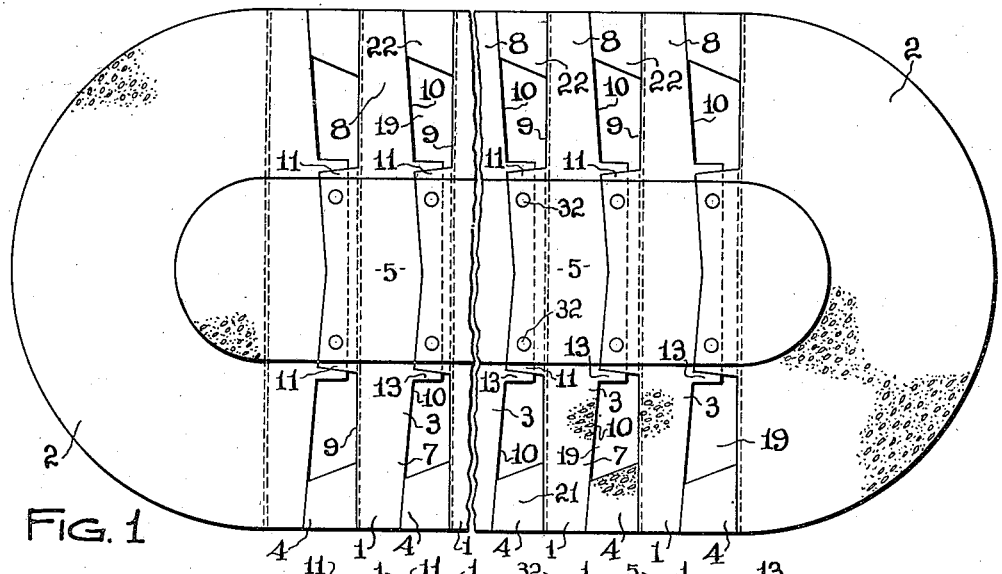

Referring more particularly to Figs. 1 to 8 inclusive of the drawing, the breakwater will be seen to comprise a multiplicity of units 1, which are assembled in interlocked relation to form a substantially rigid, unitary wall, which may be of any desired length.

Figure 2:
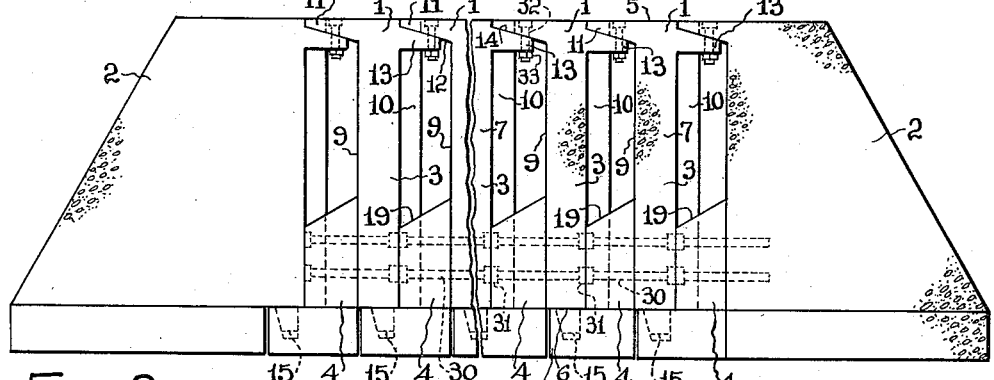
Fig. 2 is a fragmentary front elevational view, of the breakwater.

In actual use, the breakwater is usually erected substantially parallel to the shore line of the lake or other body or water, and at a distance of 200 to 300 feet from the shore line or beach, and preferably in such a manner that two to three feet of the upper part of the breakwater project above the water level. It is to be understood, however, that in some cases, the breakwater may extend at right angles to the shore line, or at any other desired angle to the shore line.

Where the breakwater is substantially parallel to the shore line, its ends may be curved to extend inwardly towards or to the shore line, but in any case, it is desirable to provide finished ends for the breakwater, in the form of units of special construction, such as shown at 2 in Figs. 1 and 2 of the drawings, these end units being interlocked with the other units in the same manner that the units 1 are interlocked with each other.

Each unit consists of an upper section 3 and a lower section 4, each section being molded or formed of concrete, which is preferably substantially reinforced, as by means of suitable steel beams, rods, or other metallic members conventionally employed for this purpose, but not shown.

The upper section 3 of the unit 1 comprises a vertical body portion of substantial height and thickness, having a flat upper end 5, a flat bottom 6, an inclined or sloping front wall 7, a similarly inclined or sloping rear wall 8, an end wall 9, and an end wall 10. The end wall 9 is substantially flat, being disposed at substantially right angles to the end 5 and bottom 6. The end wall 10, however, consists of surfaces which are inclined with relation to the end wall 9, for a purpose to be presently explained.

Extending from the wall 9 adjacent the upper end of the section 3 is a rib 11 formed integrally with the section, and extending from the front wall 7 to the rear wall 8 of the section. The upper surface of this rib is substantially flush with the end 5 of the section, but the lower surface 12 of the rib is inclined to the wall 9, as clearly shown in Fig. 4.

Extending from the wall 10, in spaced relation to the end wall 5 of the section 3, is a rib 13, the upper surface 14 of which is substantially parallel with the surface 12 of the rib 11, and the lower surface of which is substantially parallel with the upper surface of the rib 11. The rib 13, like the rib 11, extends from the front wall 7 of the section 3 to the rear wall 8 of the section, and is also formed integrally with the section 3.

The section 3 of the unit further includes a rib 15, which is formed integrally with the section, and extends downwardly from the bottom 6 of the section, this rib terminating short of the walls 7 and 8 and having inclined ends 16 and 17, and an inclined wall 18.

The lower section 4 of the unit 1 comprises a vertical body portion of substantially less height than the body portion of the section 3, but of substantially the same thickness as the latter. It has an upper end 19 which is inclined to the wall 9 of the section 3, a flat bottom 20, an inclined or sloping front wall 21, which is substantially flush with the wall 7, an inclined or sloping rear wall 22, which is substantially flush with the wall 8, an end wall 23, and an end wall 24. The end wall 24 is substantially flat, being disposed in abutment with the end wall 9 of the section 3. The end wall 23, however, consists of surfaces which are inclined with relation to the end wall 23, since they must conform with the wall 10 of the section 3, when the units are assembled in the manner to be presently described. Extending from the wall 23, adjacent the lower end of the section 4 is a base portion 25, formed integrally with the section 4, and extending from the front wall 21 to the rear wall 22 of the section 4, being provided with vertical surfaces at the ends thereof. This base portion 25 of the section 4 has a recess 26 in its upper portion, adapted for the reception of the rib 15, and having a wall 27 which is sloped to correspond to the inclination of the wall 18 of the rib 15, and end surfaces 28 and 29 which are inclined to correspond with the inclination of the ends 16 and 17 of the rib 15.

Prior to assembling the units to form the breakwater, the sections 3 and 4 of each unit are rigidly connected to each other by means of rods 30 which extend through the sections, and have nuts 31 secured to the threaded ends thereof, these nuts being counter-sunk in the sections, so that they do not project from the sections.

Figure 6:
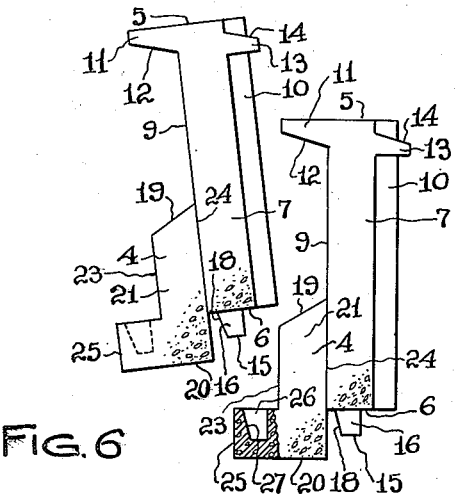
Fig. 6 is a view showing the first step in assembling the units of the breakwater with each other.
Figure 7:
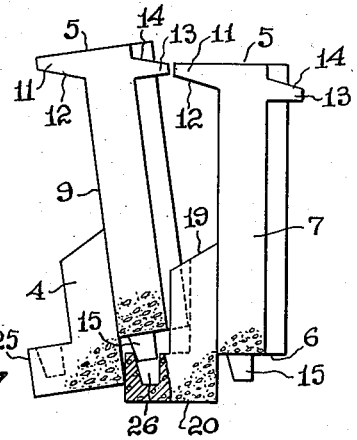
Fig. 7 is a view showing the second step in assembling the units of the breakwater with each other.

The manner in which the units are assembled with each other to form a breakwater is best shown in Figs. 6 and 7. Referring to Fig. 6, it will be assumed that the unit at the right of this figure is already in situ, with the bottom 20 of the section 4 resting on the water bottom. The unit at the left of this figure is then brought to the position shown, at an inclination to the installed unit, and then brought to the position shown in Fig. 7, the rib 15 being inserted in the recess 26 of the installed unit. The inclination of the surfaces 18 and 27 facilitates insertion of the rib 15 in the recess 26. The inclined surface 19 of the installed unit provides a temporary supporting surface for the unit which is being installed and facilitates movement of the latter unit to the position shown in Fig. 7.

After the rib 13 of the unit at the left of Fig. 7 has been moved below the rib 11 of the installed unit, the unit at the left is rocked toward the installed unit, and into vertical position, as best shown in Fig. 2. The inclined surfaces 12 and 14 of the respective ribs facilitate such movement, the surface 12 exerting a downward pressure on the surface 13 to force the rib 15 into the recess 26.

It will be noted that the units, as thus assembled, are interlocked with each other and against separation from each other in any horizontal direction, by virtue of the coaction of the ribs 15 and recesses 26, as well as by the interlocking of the inclined walls 10 and 23. In order to avoid any possibility of separation in a vertical direction, headed bolts 32 and nuts 33 are employed to interconnect the ribs 13 with the ribs 11, as shown in Figs. 1 and 2.

The end units 2 are assembled with the units 1 in a manner similar to that in which the units 1 are assembled with each other, as will be readily apparent in Figs. 1 and 2.

The breakwater, as thus formed, has a sloping front wall consisting of the surfaces 7 and 21, which sloping wall is effective to break the force or impact of waves striking the breakwater, such waves rolling over the sloping front wall, over the flat top of the breakwater and then over the sloping rear wall of the breakwater consisting of the surfaces 8 and 22. In this way, the life of the breakwater is preserved indefinitely, and sand and other debris carried by the waves is deposited on the inland side of the breakwater, thereby filling in the lagoon or body of water between the breakwater and the shore line.

It may be noted that spaced passages are formed through the breakwater between the units thereof, which passages extend entirely through the breakwater, permitting water to circulate therethrough in opposite directions, thereby preventing the formation of undesirable stagnant bodies of water or lagoons behind or within the breakwater.

Referring further to these passageways, it will be noted that the walls 10 and 9 which form the sides of these passages, form outwardly-opening wedge-like spaces, so that any ice which forms or accumulates in these spaces in winter can readily free itself from the breakwater in an extremely simple and efficient manner, thereby avoiding blocking up of such passages for long periods.

It will be apparent that the units forming the breakwater are of relatively simple and inexpensive construction, and can be easily and quickly assembled and interlocked with each other, with a minimum of handling equipment and fastening or securing devices.

Figure 3:
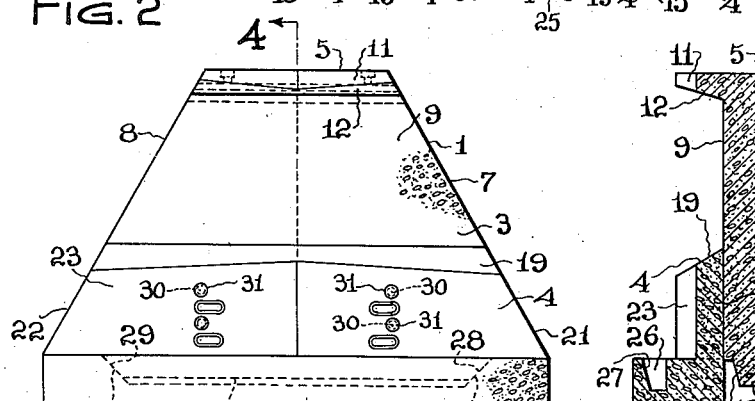
Fig. 3 is an elevational view of one side of a unit of the breakwater.
Figure 4:
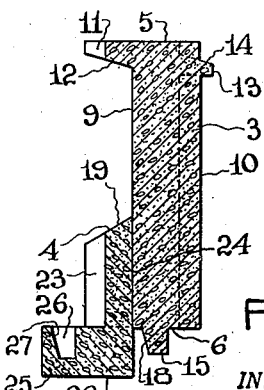
Fig. 4 is a cross-sectional view, taken on the line 4—4 of Fig. 3.
Figure 5:
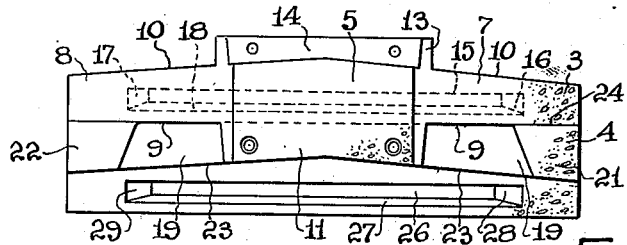
Fig. 5 is a top plan view of the unit shown in Fig. 3.

Referring to Figs. 2 and 3, it will be noted that a series of vertical openings are provided through the sections of each unit for the rods 30 which are used to connect the sections to each other. This arrangement of openings permits vertical adjustment of the section 4 relatively to the section 3 prior to installation, in cases where it is necessary to increase the height of the unit.

Figure 8:
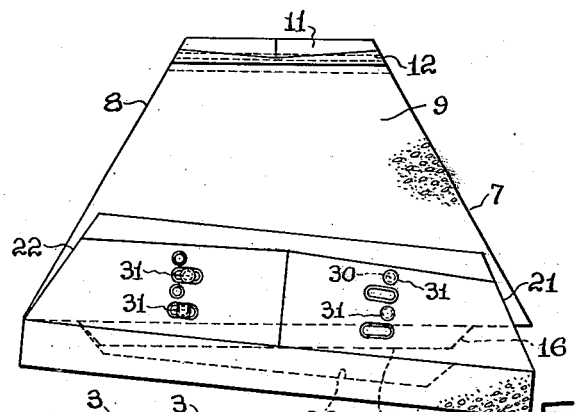
Fig. 8 is a view similar to Fig. 3, but showing an adjustment of the lower portion of a unit of the breakwater to accommodate the unit to a sloping beach or bottom.

Referring to Fig. 8, it will be seen that several of the openings through which the rods 30 extend are elongated in a direction transverse to the length of the openings. This permits adjustment of the section 4 relatively to the section 3 in the manner clearly shown in this figure, to meet a condition in which the water bottom is inclined to the upper surface of the unit.

Figure 9:
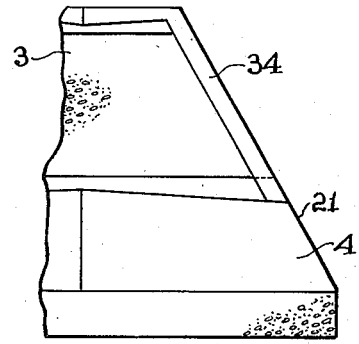
Fig. 9 is a fragmentary view, similar to Fig. 3, but showing a modified form of unit.
Figures 10, 11:
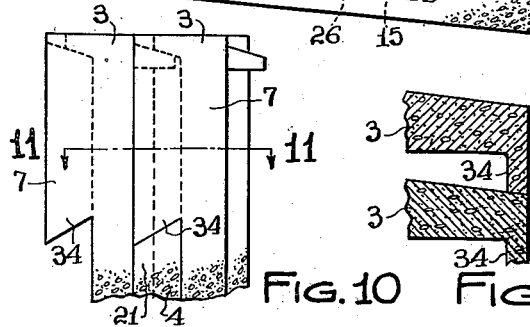
Fig. 10 is a fragmentary view, similar to Fig. 2, but showing a breakwater comprising the units of Fig. 9.
Fig. 11 is a fragmentary cross-sectional view, taken on the line 11—11 of Fig. 10.

Referring to Figs. 9 to 11 inclusive, there is illustrated a modification of the invention, in which the sections 3 of each unit are provided with flanges 34 formed integrally with the section and adapted to cover or block the passages through the breakwater. In some cases, it is desirable to block one or both ends of these passages to prevent circulation of water through the breakwater. It will be observed, in Fig. 9, that the front surface of the flange 34 is flush with the surfaces 7 and 21 of the units.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a breakwater of the character described, a multiplicity of units in end to end arrangement with each other, each unit having a rib adjacent its upper end extending in one direction therefrom and a rib adjacent its upper end extending in the opposite direction therefrom and offset vertically from the first rib, a rib extending downwardly from the lower end of the unit, a dependent laterally extending projection at one side of the lower end of the unit having a groove in the upper face thereof, the first named rib of each unit coacting with the second-named rib of an adjacent unit, for preventing separation of the units from each other in a vertical direction, and the third-named rib of each unit coacting with the groove of an adjacent unit for preventing separation of the units from each other in a horizontal direction.

2. A breakwater, as defined in claim 1, in which fastening means are provided for connecting the first-named rib of each unit to the second-named rib of the adjacent unit.

3. A breakwater unit of the character described, said unit comprising a body portion, a rib adjacent the upper end of said body portion extending in one direction from said body portion, a second rib adjacent the upper end of said body portion extending in the opposite direction from said body portion and offset vertically from the first rib, a third rib extending downwardly from the lower end of said body portion, and a dependent laterally extending projection at one side of the lower end of said body portion having a groove in the upper face thereof.

OSCAR P. KUBACH.

REFERENCES CITED

The following references are of record in the file of this patent:

UNITED STATES PATENTS

| Number | Name | Date |
|---|---|---|
| 1,893,003 | Schlueter | Jan. 3, 1933 |
| 1,948,639 | Youngberg | Feb. 27, 1934 |
| 2,159,685 | Brezzell | May 23, 1939 |
| 2,301,592 | Teuber | Nov. 10, 1942 |